United States Patent [19]

Canther

[11] Patent Number: 5,498,333
[45] Date of Patent: Mar. 12, 1996

[54] COVER AND LID WITH SEALABLY ENCLOSED GASKET FOR SWIMMING POOL

[76] Inventor: David M. Canther, P.O. Box 1238, Eustis, Fla. 32727

[21] Appl. No.: 419,277

[22] Filed: Apr. 10, 1995

Related U.S. Application Data

[63] Continuation-in-part of Ser. No. 258,481, Jun. 10, 1994, and a continuation-in-part of Ser. No. 23,901, Jun. 2, 1994, Pat. No. Des. 355,022.

[51] Int. Cl.⁶ .............................. C02F 1/76; B65D 39/08; B65D 39/16
[52] U.S. Cl. ........................ 210/198.1; 210/169; 210/443; 422/261; 215/228; 215/356; 230/212.5; 230/308; 230/377; 230/378
[58] Field of Search .................... 210/169, 198.1, 210/443; 422/261; 220/212.5, 308, 377, 378; 215/228, 356

[56] References Cited

U.S. PATENT DOCUMENTS

| | | |
|---|---|---|
| 1,423,464 | 7/1922 | Shaw . |
| 2,003,460 | 6/1935 | Paull . |
| 2,528,948 | 11/1950 | Di Cosmo . |
| 3,918,582 | 11/1975 | Wallace .................................. 206/362 |
| 5,246,133 | 9/1993 | James ..................................... 220/377 |
| 5,287,982 | 2/1994 | Tsai ..................................... 220/212.5 |
| 5,373,953 | 12/1994 | Fenton et al. .......................... 215/228 |

*Primary Examiner*—Neil McCarthy
*Attorney, Agent, or Firm*—William F. Hamrock

[57] ABSTRACT

The invention is directed to a transparent plastic cover for a chlorinator container or lid for a filtering container used in swimming pools. The cover or lid is prepared from transparent plastic which is durably resistant to attack by the chlorine fumes and chlorinated water in the containers. The cover or lid includes a gasket sealably enclosed between the cover or lid and the container and is protected from the chlorine fumes and the chlorinated water in the containers.

17 Claims, 7 Drawing Sheets

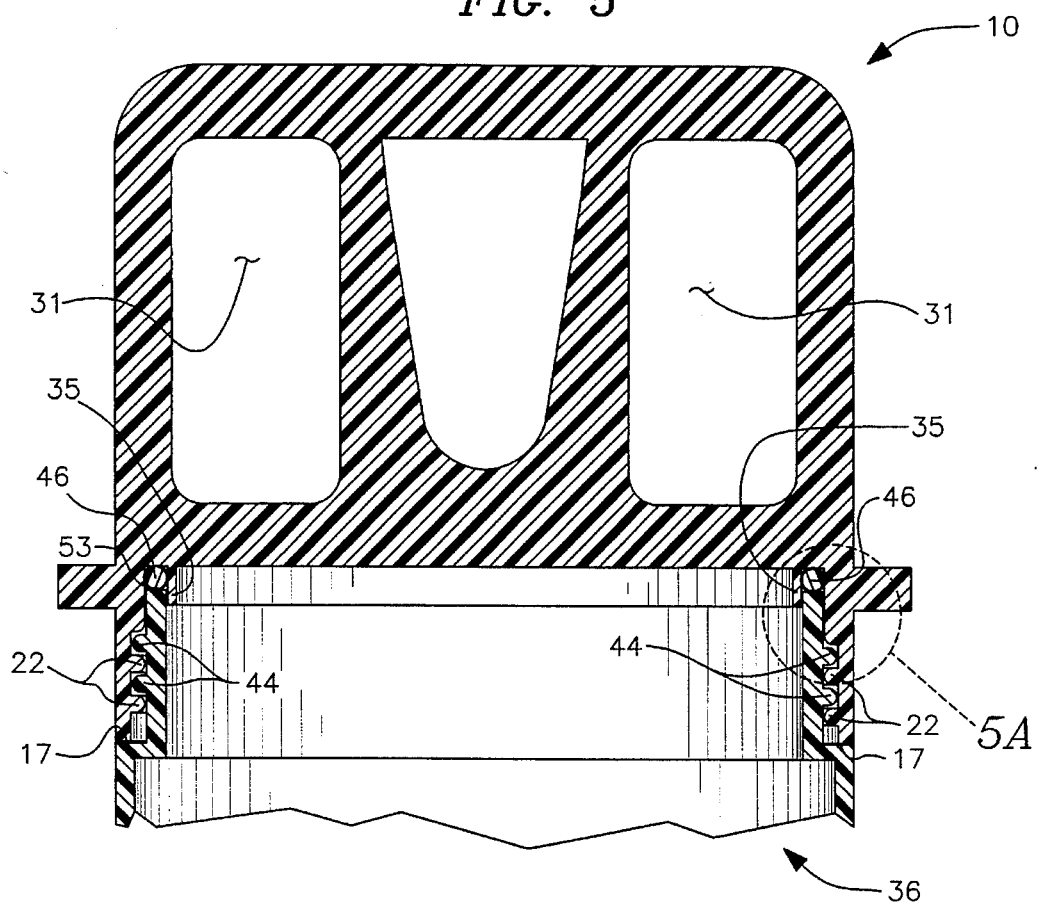
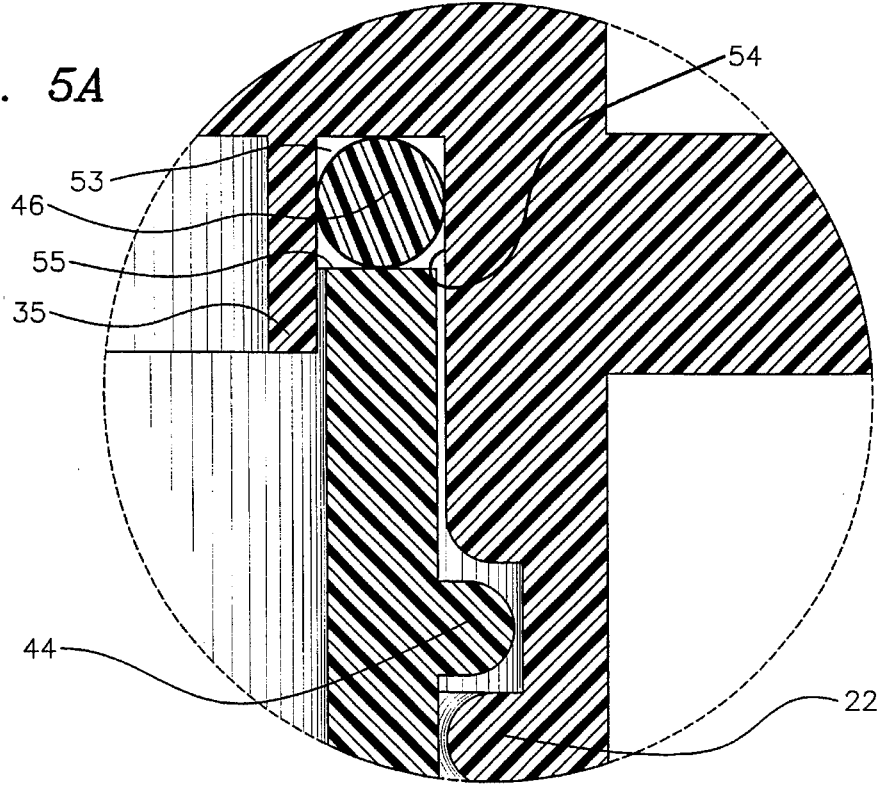

5,498,333

COVER AND LID WITH SEALABLY ENCLOSED GASKET FOR SWIMMING POOL

This application is a continuation in part of U.S. patent application Ser. No. 08/258,481 filed on Jun. 10, 1994, and Ser. No. 29/023,901 filed on Jun. 2, 1994, now U.S. Pat. No. D355,022.

BACKGROUND OF THE INVENTION

1. Field of the Invention

The invention relates to a cover for a swimming pool chlorinator cannister and to a lid for a swimming pool filtering cannister, and more particularly, to a durable and transparent cover and lid which are easy to remove from the cannisters and have a rubber gasket sealably enclosed between the cover or lid and the cannister.

2. Description of the Prior Art

Swimming pools usually contain a pressurized chlorinator cannister which dispenses chlorinated water into the pool and a filtering cannister which removes material from the pool.

Swimming pool chlorinators are well known and widely utilized throughout the industry. Most chlorinators dispense chlorine into the pool water while the chlorinator is immersed in the water. The water generally should be maintained at a chlorine concentration of from 0.1 to 25.00 parts per million by weight chlorine, preferably from about 0.3 to about 5.0 parts per million. The concentration of the chlorine is affected by a number of factors such as changes in water temperature, periods of rain, the size of the pool and how often the pool is being used, among other factors. Various types of chemical compounds which release chlorine into the water are used in the chlorinator such as calcium hypochlorite compounds which dissolve rapidly and trichloroisocyanurate compounds which dissolve slowly. The chlorine chemical compounds are usually in tablet form.

A particular type of chlorinator that is in general use in swimming pools includes a circular cannister which is mounted to the incoming water circulation system of the pool. The cannister holds the chlorine chemical compound in a cannister container which is usually about twelve inches deep and about six and half inches in outside diameter. Fluid inlet and outlet units connect the cannister to the pipes for circulating the pool water through the cannister and to contact with the chlorine chemical compound therein. The chlorine chemical compound which is usually in tablet form is placed through the open end into the cannister container. The open end of the cannister may be fitted with a removable cover which is usually made of opaque plastic to make it chemical resistant. However, these opaque plastic covers are still subject to cracking and deterioration during use from contact with the chlorine compound and chlorine gas. The plastic cover has a circular body and a flat top projection and fits within the open top of the cannister container. The cover during use usually becomes overtightened and thus has to be removed from the top of the cannister container by means of a tool or wrench which must fit within the structure of the flat top projection such as when the projection is square, hexagonal or other structure configuration. Usually, the connecting surface of the cover is provided with female threads to fit within mating threads on the top of the cannister container which results in an overtightened fluid tight sealed engagement during use between the cover and the cannister container. Since the plastic cover is opaque and subjected to cracking and deterioration, it is impossible to see through. Since the structure of the cover is poorly designed, the cover cannot be removed with a person's hands but only be removed from the cannister container by resorting to tools.

Another problem that has plagued the chlorinator cannister industry is the deterioration of the rubber gasket which generally is inserted between the cover and cannister container. The rubber gasket is used to provide a securing seal between the cover and cannister container but has created innumerable problems from being exposed to the chlorinated fumes and chlorinated water causing the rubber gasket to deteriorate within a short period of time. It appears also that currently there is too much tolerance permitted for the rubber gasket is used in a channel which allows the gasket to pinch or cut after a short period of time of use caused by sticking and/or traveling of the gasket.

Swimming pool filtering systems are likewise widely utilized. The filtering system which is located usually on the return side of the water circulation system generally includes a circular filtering cannister containing a strainer basket for filtering the circulated pool water. Fluid inlet and outlet units connect the filtering cannister to the pipes for circulating the water therethrough. The filtering cannister generally includes a cannister container having an open top fitted with a translucent plastic lid. The plastic lid generally has a circular body with an upwardly protruding solid bar about one and a half inches high and about one and three quarter inches wide. Usually, the connecting surface of the lid is provided with male threads which fit within the mating threads on the top of the filtering cannister container which also results in an overtightened fluid tight sealed engagement during use between the lid and the filtering cannister container. Although the lid is made with translucent plastic, the lid is subjected to cracking, excessive clouding and deterioration during use making it extremely difficult or impossible to see through. Although the protruding bar is provided on the top surface of the lid, it does not allow for proper leverage to be applied to the lid by a person in order to remove the overtightened lid with the hands because there is no place to properly grip the solid bar in order to turn it.

It is common practice among swimming pool owners to perform their own general pool maintenance tasks. In doing so, the amount of chlorine chemical compound remaining in the chlorinator must be checked frequently while the pool is being used. This is usually accomplished by the person inspecting the amount of chlorine tablets remaining in the chlorinator by being required to completely remove the cover from the cannister with a tool such as a wrench. It is necessary to use tools to remove the cover for a number of reasons. First, since the cover has to be constructed of an opaque material to make it more resistant to chlorine, the opaque cover is impossible to visually see through. Second, the cover is difficult to remove from its sealed engagement with the cannister container even when using a wrench due to overtightening, deterioration and various other durability defects. Third, because of the exterior structure of the typical cover presently used, such as the flat top projection, there is nothing on the cover which would allow for manually gripping the cover exterior for removing it by means of person's hands; thus, making it necessary to employ tools, such as wrenches, in the time consuming and difficult procedure to remove the cover.

The filtering cannister likewise must be routinely inspected and cleaned out in performing pool maintenance tasks. This is usually accomplished by the person removing the lid, usually with a wrench, to inspect the interior of the filtering cannister and strainer basket. Although it is known that a translucent plastic lid is used on some filtering cannisters, this translucent plastic lid is still subject to deterioration in use. The deterioration is caused by contact with the chlorine fumes and chlorinated water resulting in cracking and excessive clouding within the translucent plastic lid making it extremely difficult, if not impossible, to visually see through. With respect to the protruding bar on the lid which is intended to act as a leverage bar so as to manually remove the lid from the filtering cannister container, it does not work as intended because there is not enough hand or finger space to grip the bar properly in order to turn the lid. This is particularly the situation when the pool piping is too close to the filtering cannister. Thus, along with the general overtightening of the threaded connection of the lid to the cannister container while in use and of the failure of the rubber gasket, the same deficiencies exist with the lid of the filter cannister as exist with the cover fo the chlorinator.

Although there is prior art directed to modifying plastic covers of pool chlorinators to make them more easily removable using tools, I am not aware of any prior art directed to a modified cover which not only makes the cover durably transparent while in use in order to visually inspect the chlorine compound remaining therein but also to so modify the cover to be easily removable from the cannister container with a person's hands thus avoiding the use tools. Likewise, with respect to the lid for the filtering cannister, I am not aware of any lid having male threads which is resistant to deterioration and clouding within the plastic and remains transparent in use, and which is easily removed with a person's hands. Additionally, I am not aware of a modified cover or lid having my improved gasket and channel arrangements.

SUMMARY OF THE INVENTION

It is an object of the present invention to provide a cover for a chlorinator cannister which can be manually put-on and removed without requiring tools.

It is another object of the present invention to provide a manually operated cover for a chlorinator cannister which is transparent and durable.

It is another object of the present invention to provide a lid for a filtering cannister which can be manually put-on and removed without requiring tools.

It is another object of the present invention to provide a lid for a filtering cannister which is transparent and durable.

It Is another object of the present invention to provide a manually operated and durably transparent cover or lid to replace existing covers or lids.

It is another object of my invention to provide covers and lids for cannister containers which provides a tight seal while preventing the rubber gasket from being exposed to the chlorine fumes and chlorinated water.

Briefly summarized, the chlorinator cover and filtering cannister lid of the present invention comprise a cover and lid which can be removably secured to the chlorinator cannister or filtering cannister The cover and lid are prepared from transparent plastic material which remains transparent in use and is durably resistant to attack by the chlorine chemical compound thereby preventing cracking and internal clouding within the plastic cover and lid. The cover and lid include side arm handles located inside of the perimeter of the cover or lid. This allows the cover andlid to be easily manipulated by a person's fingers and hands to secure the cover or lid to the chlorinator cannister or filtering cannister or to remove it therefrom. The position of thd side arm handles inside of the perimeter of the lid is particularly important in order to remove or replace the lid because of the close proximity of the pool piping to the filtering cannister which would interfere with moving overextended handles. Thus, the present invention solves a long existing problem in pool maintenance by being able to inspect the chlorine tablets in the chlorinator and the filtered residue in the filtering cannister by visually seeing through the cover and lid and by being able to manually remove the cover and lid with the hands when required.

According to the preferred embodiment of the invention, the cover and lid have side arm handles located inside of the perimeter of the cover or lid which can be gripped by a person's fingers to easily turn the cover and lid in its threaded engagemendent within the top of the cannister container. The cover and lid are prepared from a durably transparent plastic material which is resistant to cracking and discoloration. The sealing of the chlorinator cannister container by means of the rubber gasket has been unexpectedly improved by sealing the rubber gasket from contact with the chlorine fumes and chlorinated water and has increased the longevity and efficiency of the system.

BRIEF DESCRIPTION OF THE DRAWINGS

A better understanding of the present invention will be had upon reference to the following detailed description when read in conjunction with the accompanying drawings, wherein like reference characters refer to like parts throughout the several views, and in which:

FIG. 5 is a sectional view of the cover connected to the chlorinator cannister container.

FIG. 5A is an enlarged view of the gasket embedded in the channel of FIG. 5.

DETAILED DESCRIPTION

The transparent plastic cover and lid disclosed herein are not merely another plastic cover or lid which deteriorates in use within a short period of time making it impossible to visually inspect the chlorine chemical and filtered residue in the cannister container without removing the cover or lid with a wrench. To the contrary, the present plastic cover and lid remain substantially transparent in use permitting visual inspection of the chlorine chemical and filtered residue in the cannister container which substantially simplifies the maintenance procedure. Also, the improved structure of the cover and lid further simplifies the maintenance procedure by being able to manually remove and replace the cover or lid on the cannister container without resorting to the use of tools. Further, and most importantly, the position of the channel having the gasket embedded therein on the underside of the cover prevents deterioration of the gasket and produces a secure and lasting seal not previously available.

Figure 1:
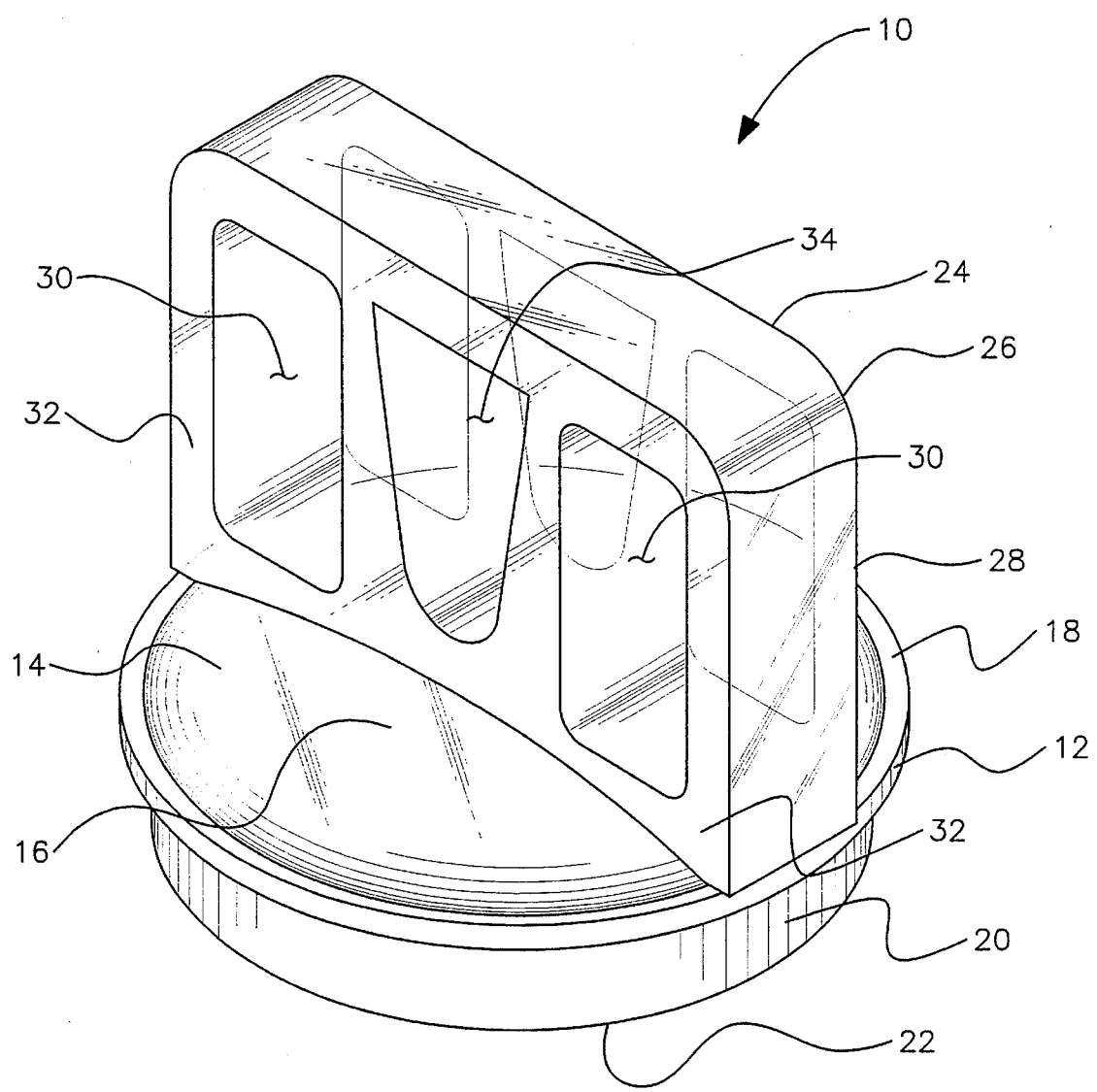
FIG. 1 is a perspective view showing the cover of the present invention having female threads.
Figure 4:
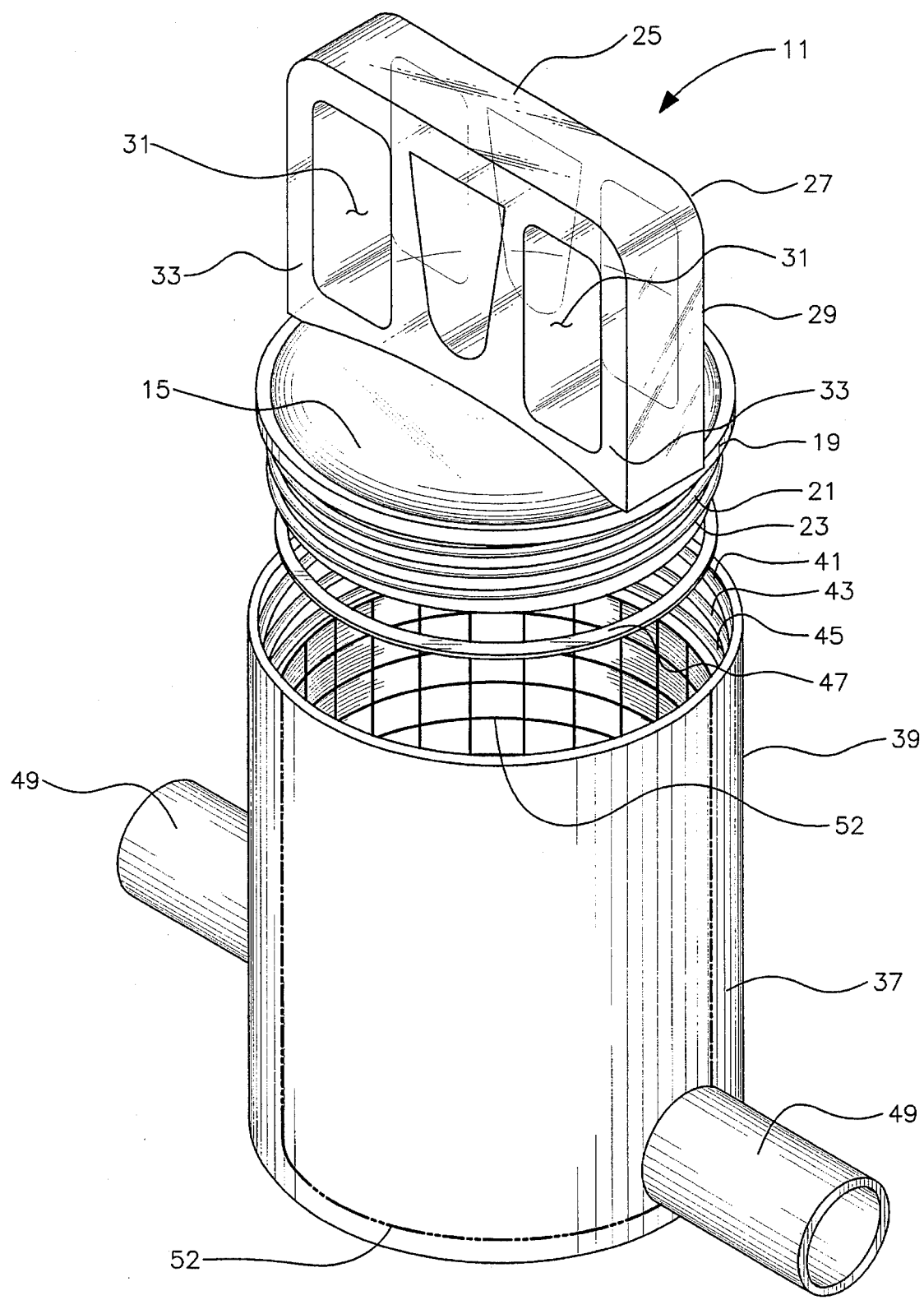
FIG. 4 is a perspective view of the lid of the present invention having male threads being attached to a filtering cannister container.

Referring now to the drawings, there is shown in FIG. 1 a preferred embodiment of a transparent plastic cover 10 of the invention. The structure and the plastic material of cover 10 which attaches to the chlorinator cannister container and lid 11 which attaches to the filtering cannister container in FIG. 4 are the same except that they are made to fit their respective cannister container and also cover 10 has female threads as opposed to the male threads of lid 11. The construction of cover and lid and the plastic material from which they are formed as well as the locations of the rubber gaskets are essential features of the present invention. The cover and lid are formed by molding with a plastic material which is resistant to the chlorine chemical compounds commonly used in chlorinators and pools. The plastic material is not only transparent but retains its transparency over long periods of time. After much research, it has been found that covers and lids made with transparent, ultraviolet stabilized polycarbonate resin and polyetherimide resin have proven to be durable and transparent and have retained the transparency in use. After subsequent continuous research, it has been discovered that clear polyvinyl chloride which is ultraviolet stabilized and chlorine resistant has proven to provide excellent longevity against cracking and clouding and is the preferred material.

The dimensions of the cover and lid are such that they fit snugly on the top open end of the cannister container. The locations of the rubber gaskets are discussed below.

Figure 2:
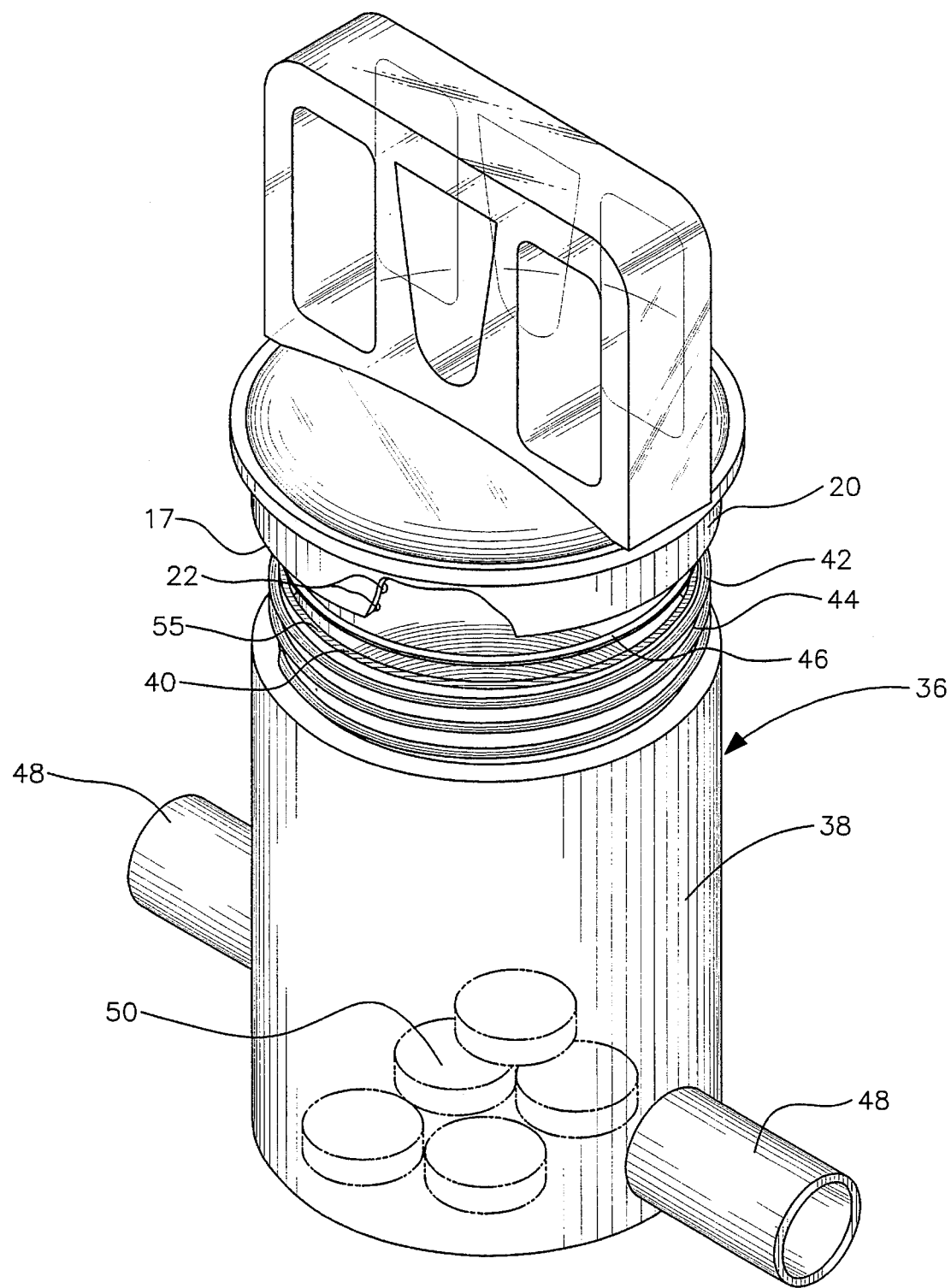
FIG. 2 is a perspective view of the cover partly in section being attached to an example of a chlorinator cannister container.

The exterior of cover 10, as shown in FIG. 1, has a substantially circular body 12 having a upper exterior surface 14 formed with a slightly rounded upper interior surface 16 surrounded by an outer flat rim 18. A continuous flange 20 is shown extending perpendicularly from beneath the outer flat rim 18. Preferably, the flange 20, as shown, is provided with internal female threads 22 although either external male or internal female threads may be used to mate with compatible threads on the open end of the cannister container such as shown in FIG. 2. A secure sealed engagement on the open end of the cannister container is provided by overlapping rim 17 coming in contact with the adjacent open end exterior surface of the cannister container and is tightened in place by turning flange 20 on the adjacent compatible threaded surfaces. This causes a pressure seal on rubber gasket 46 in U-shaped channel 53 pressing against the top flat surface 55 of the cannister container.

Figure 1A:
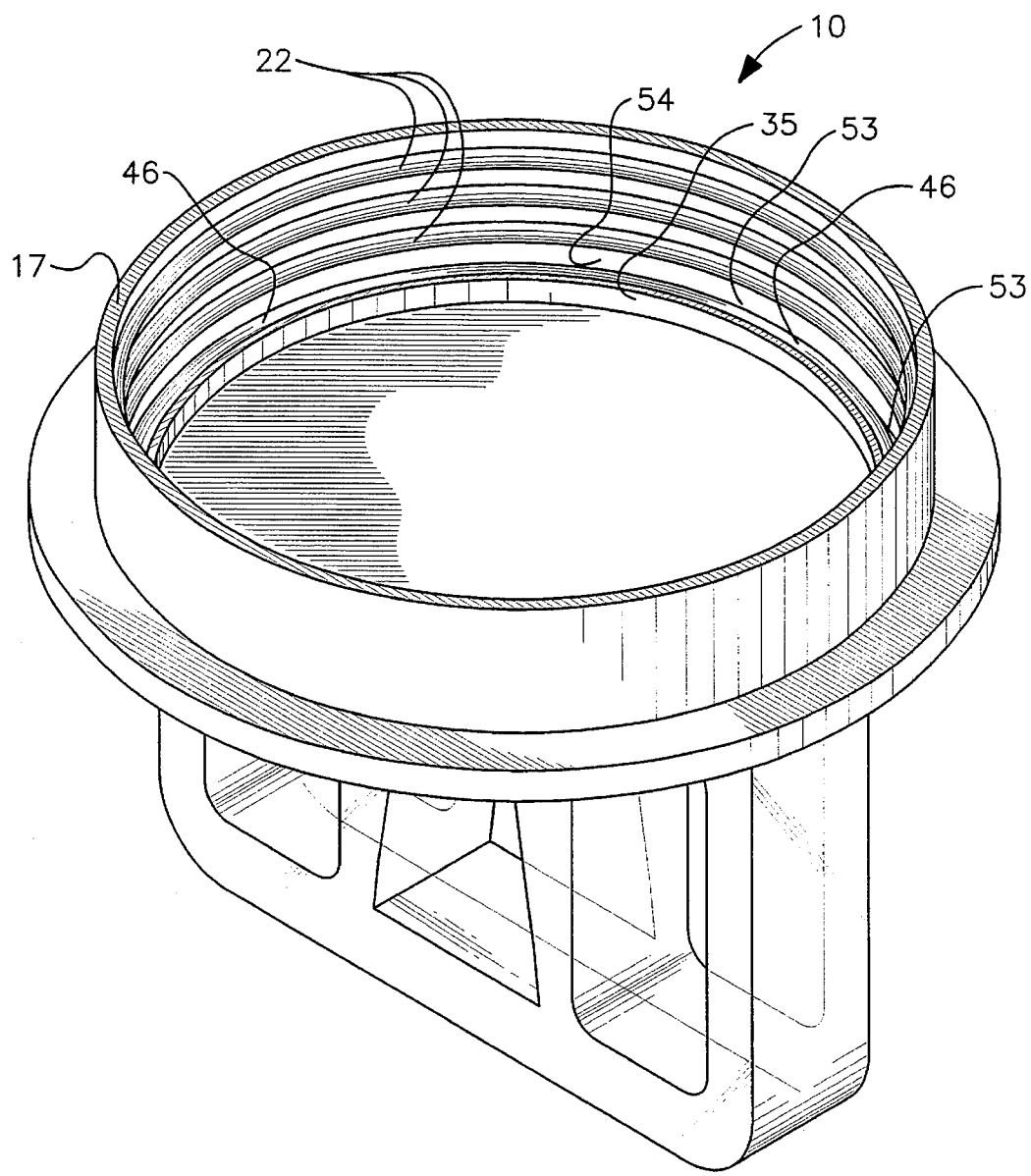
FIG. 1A is a perspective view of the underside of the cover.

Referring to FIG. 1A, and FIGS. 5 and 5A, the underside of cover 10 is depicted showing internal female threads 22 encompassing the inside surface of flange 20. U-shaped channel 53 is formed within inner wall 35 and flange interior surface 54 and is seen encircling the top inside edge of the cover just above the threaded surface. Embedded within channel 53 is rubber gasket 46 which lies between inner wall 35 and flange interior surface 54 wherein the wall 35 extends slightly within the interior of the cover. Channel 53 is about one half of an inch in depth and about one quarter of an inch in width. Rubber gasket 46 is slightly less than one quarter of an inch in diameter so that it fits down into the larger one quarter inch width by one half inch depth channel. The critical location of the large U-shaped channel 53 placed on the inside of the threaded surface and the enclosed small sized embedded gasket 46 which has zero tolerance and cannot travel or stretch causes a pressure seal with the cannister container and prevents stretching and expanding of the gasket during use which will be discussed below. The dimensions of the circular body portion of the cover are such that the cover will fit snugly in the open top end of the cannister container. Generally, the circular body portion of the cover has a diameter of about six and a half inches and a thickness of one quarter inch.

Handle bar assembly 24 is integrally formed on the upper exterior surface 14 projecting upwardly therefrom by which the cover may be manually removed from the cannister container with a person's hands without resorting to tools. The handle bar assembly is generally about six and a half inches in length, about four and a half in height and about one and a half inches in thickness. The handle bar assembly includes a longitudinal rectangular block element 26 integrally aligned with upper exterior surface 14 whereby the handle bar assembly acts as a fulcrum extending across the upper exterior surface 14. Two opposing handles 28 are formed, one handle at each end of the block element, where each handle is within the perimeter of the outer flat rim 18. The handles are formed from rectangular shaped slots 30 provided in the block element which are large enough for a person's fingers to fit in to grip bar 32 and to turn the cover on or off the cannister container. Opening 34 is formed in the central area of the block element allowing the cover to be picked up with the fingers.

Shown in FIG. 2 is a partial sectional view of a preferred embodiment of the invention where the cover is joined to a chlorinator cannister container 36. Generally, chlorinator cannister container 36 includes a cylindrical wall 38 and an open top 40. The open top is provided with an annular collar 42 with external male threads 44 which engage internal female threads 22 of the cover. FIGS. 5 and 5A show the cover is threadedly secured to the cannister container 36. Rubber gasket 46 is shown embedded in channel 53 which is located to the inside of internal female threads 22 between the interior surface 54 of flange 20 and inner wall 35. A pressure seal is obtained when top flat surface 55 of the cannister container fits into channel 53 in contact with rubber gasket 46. As seen in FIGS. 5 and 5A, channel 53 and rubber gasket 46 are sealed from contact with material or liquid such as chlorine fumes or chlorinated liquid in cannister container 36 by its enclosed and protected position. The critical location of U-shaped channel 53 permitting the sealed engagement of the rubber gasket in the present invention has solved a problem that has plagued the chlorinator cannister container industry. In prior art chlorinator cannisters, the rubber gasket is exposed to the chlorine fumes and chlorinated water causing build-up of residue and chlorine on the gasket resulting in deterioration of the gasket and inefficient operation of the chlorinator cannister. In the present invention, the U-shaped channel 53 and the smaller embedded rubber gasket 46 has overcome the deficiencies attributed to the prior art by avoiding continuous exposure of the gasket to chlorine fumes and chlorinated water thereby increasing its longevity and usefulness. Also, wherein rubber gasket 46 has a diameter of slightly under one quarter of an inch and has zero tolerance and is embedded in the larger U-shaped channel 53 measuring about one quarter wide and one half inch deep, the gasket is prevented from stretching or expanding with age. In prior art gaskets, too much tolerance of the gasket generally of about one half an inch to three quarters of an inch in size is allowed when embedded in channel having the equivalent size or smaller size than the gasket, thus allowing prior art over sized gaskets to pinch or cut after a short period of use resulting in stretching and/or expanding of the large gasket. Generally, as seen in FIG. 2, fluid inlet and outlet units 48 typically connect the cannister container with the water circulation system which is not shown. Chlorine chemical compound tablets 50 are indicated in the chlorinator cannister. When the swimming pool is in use, the amount of chlorine tablets remaining in the cannister container can be determined visually by a person looking down through the transparent plastic cover 10 thus avoiding the time consuming task of being forced to remove the cover with a wrench in order just to see if there are any chlorine tablets remaining in the container. The chlorine chemical tablets 50 may be replaced as required by removing the cover after looking through the transparent plastic cover and seeing that they have diminished in content. The dimensions of the chlorinator cannister container are generally about six and a half inches in diameter and about twelve inches deep. The two handles 28 of block element 30 are located within the outer edge of the outer rim. Rectangular slots 30 are made large enough for a person's fingers to fit through and grip bar 32 and then turn handles 28 to rotate the cover on the threads either on or off the cannister housing. Generally, rectangular slots 30 are about three and a half inches in height and about one and a half inches wide. The grip bar is about one half inch in thickness.

Figure 3:
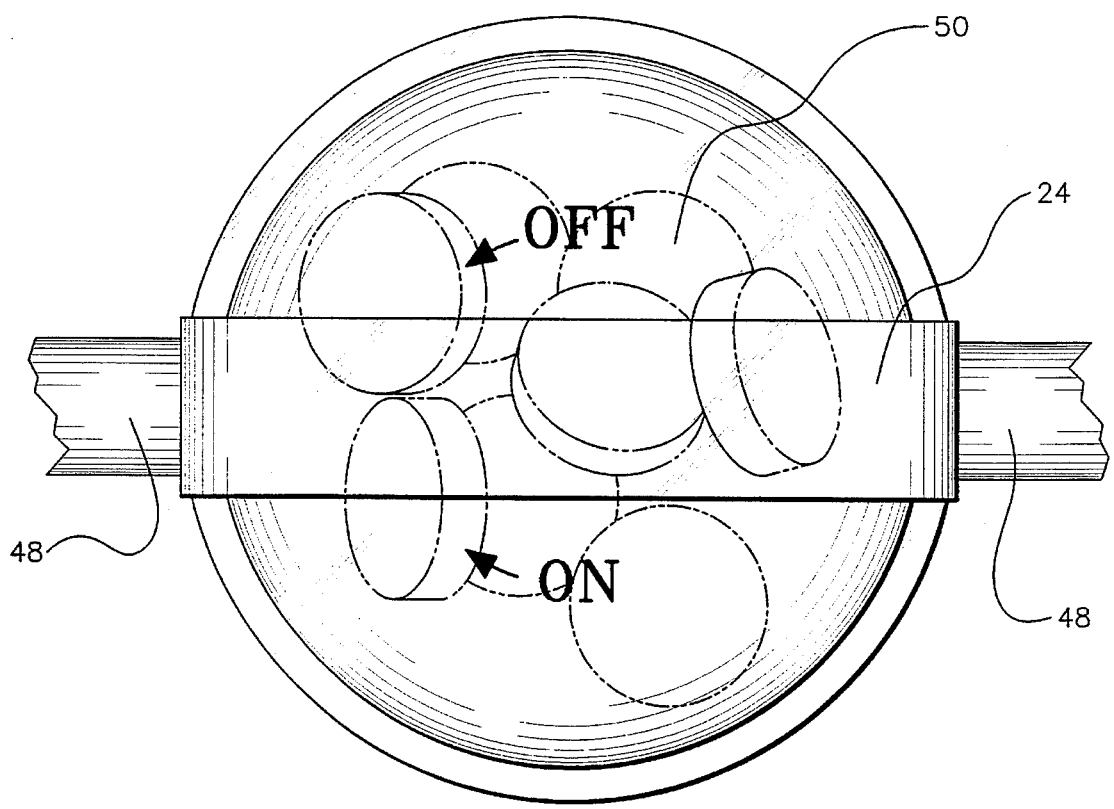
FIG. 3 is a perspective view looking down through the transparent cover into the chlorinator cannister container and viewing the chemical chlorine tablets therein.

FIG. 3 is a perspective view of transparent plastic cover 10 on the cannister container 36 showing the amount of chlorine tablets 50 remaining in the chlorinator, when visually looking through the transparent plastic cover. Shown in FIG. 4 is a preferred embodiment of the invention wherein lid 11 is being attached to a filtering cannister container 37. Generally, filtering cannister container 37 as shown includes a cylindrical wall 39 and an open top 41. Typically, the open top is provided with an annular collar 43 with internal female threads 45 which engage the exterior male threads 23 of the lid. In the present invention, filtering cannister container 37 contains rubber gasket 47 to more sealably enclose and secure the lid with the top flat surface 51 of the threaded annular collar 43 as discussed below. Fluid inlet and outlet units 49 are indicated to connect the filtering cannister with the water circulation system. Generally, a strainer basket 52 is fitted within the filtering cannister container to filter out the filterable material.

Figure 6:
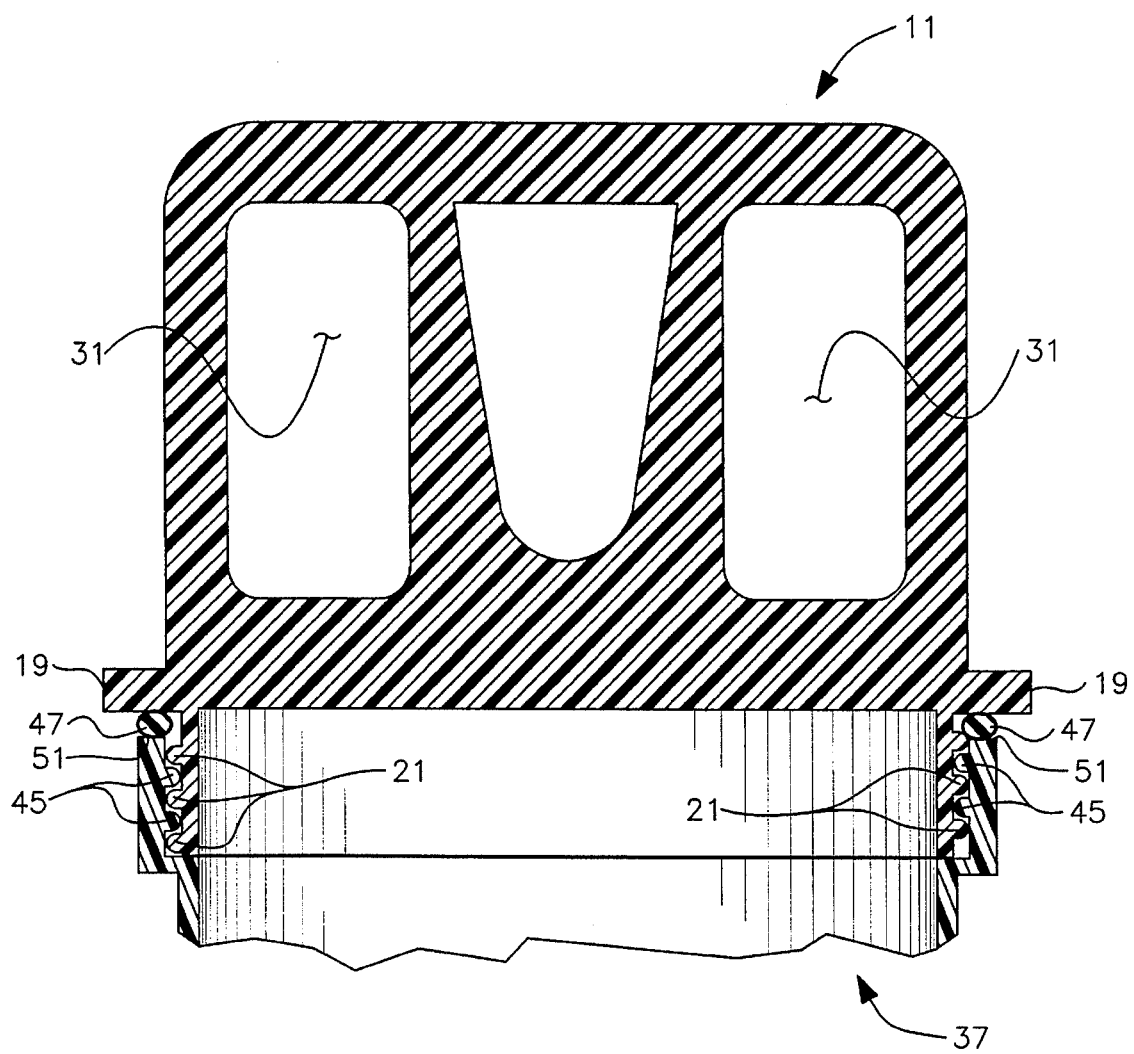
FIG. 6 is a sectional view of the lid attached to the filtering cannister container.

One major difference between lid 11 and cover 10 which is shown in FIGS. 1, 1A, 2, 3, 5 and 5A is that lid 11 in FIGS. 4 and 6 is provided with external male threads 23 on externally male threaded flange 21 which extends about its entire circumferential periphery. Also, and of major importance, rubber gasket 47 is placed on the outside above the threads of male threaded flange 21 which causes a pressure fit on the top flat surface 51 of the filter cannister. Gasket 47 is placed on outside of male threads which prevents continuous exposure of the gasket to the chlorine fumes and chlorine water within filter cannister container 37. The lid is sized to fit the filtering cannister container which may make its dimensions different from the dimensions of cover 10. Lid 11 has a substantially circular body 13 and an upper exterior surface 15. Lid flange 21 is provided with male threads 23 although either female threads or male threads may be used on a lid to mate with compatible threads on the open end of the filtering cannister container sealed engagement. A secure sealed engagement on the open end of the filtering cannister container 37 is provided by overlapping outer rim 19 coming in contact with the adjacent open end exterior surface of the filtering cannister container and is tightened in place by turning flange 21 within the adjacent compatible threaded surfaces causing a pressure seal of the rubber gasket 47 on the top flat surface of the filter cannister 37. The dimensions of the circular body 13 of the lid are such that the lid fits snugly in the open top end of the filtering cannister container.

FIG. 6 is a cross sectional view showing how lid 11 is threadedly secured to filter cannister container 37. Rubber gasket 47 is shown placed above external male threads 23 of lid 11 and is pressed between overlapping outer rim 19 and top flat surface 51. A pressure seal is obtained when rubber gasket 47 is secured on the outside at the top of male threads 23 between overlapping outer rim 19 of the lid and top flat surface 51 of the filter cannister container. The location of gasket 47 as shown on the outside causes a pressure fit on the top flat surface 51 of filter cannister container 37 which prevents continuous exposure of the gasket to the chlorine fumes and chlorinated liquid inside the container.

The filtering cannister handle bar assembly 25 is integrally formed on the upper exterior surface 15 projecting upwardly therefrom by which the lid may be manually removed from the filtering cannister container with a person's hands without resorting to tools. The filtering cannister handle bar assembly includes a longitudinal block element 27 integrally aligned with exterior surface 15 whereby the handle bar assembly acts as a fulcrum extending across exterior surface 15. Two opposing handles 29 are formed, one handle at each end of block element 27, where each handle coincides with the outer edge of the outer rim 19. The handles are formed from rectangular shaped slots 31 provided in the block element which are large enough for a person's fingers to fit in to grip bar 33 and to turn the lid on or off the filtering cannister container.

Having now described the invention, it will be apparent to one of ordinary skill in the art that many changes and modifications can be made thereto without departing from the spirit and scope of the invention as set forth herein.

What is claimed is:

1. A manually removable transparent plastic cover or lid for a container having side walls with a top flat surface and an open top providing an interior comprising said cover in combination with a pool water circulating chlorinator cannister container and said lid in combination with a pool water circulating filtering cannister container, the cover or lid having unitary construction molded from transparent plastic provided with a circular base and an integrally formed handle bar assembly projecting upwardly therefrom, the circular base provided with an exterior upper surface with a circumferential outer rim and a continuous flange extending perpendicularly beneath the outer rim, the flange for sealably engaging the open top of the cannister container and providing a gasket means sealably enclosed between the cover or lid and said top flat surface and sealing said gasket from said cannister container interior, the handle bar assembly providing a rectangular shaped block element with a terminal gripping bar formed at each end thereof, the block element extending longitudinally across the upper surface of the circular base, the terminal gripping bars formed from open slots provided in the block element, whereby the terminal gripping bars are adapted for gripping with the fingers of a person to turn the cover on or off the open end of the cannister container.

2. The cover or lid according to claim 1 wherein the transparent plastic material is a ultraviolet stabilized polyvinyl chloride plastic.

3. The cover according to claim 1 wherein the flange provides internal female threads sealably threadedly engaging the cannister container providing male threads and sealably embedding the gasket means in an enclosed U-shaped channel.

4. The cover or lid according to claim 3 wherein the size of said U-shaped channel is larger than said gasket means allowing the gasket means to be completely embedded therein and the top flat surface of the cannister container to be inserted therein.

5. The cover according to claim 4 wherein said U-shaped channel is enclosed between the flange interior surface and an inner wall.

6. The cover according to claim 5 wherein said gasket means is a rubber gasket ring slightly less than one quarter inch in diameter and said channel is about one quarter of an inch wide and about one half an inch deep.

7. The cover according to claim 6 wherein said rubber gasket ring has low tolerance limiting stretching or traveling of the rubber gasket.

8. The cover or lid according to claim 1 wherein the flange provides external male threads sealably threadedly engaging the cannister container providing internal female threads and sealably engaging said gasket means on the outside of said external male threads.

9. A cover or lid according to claim 8 wherein said gasket means is sealably enclosed above said external male threads and said cannister female threads.

10. A cover or lid according to claim 9 wherein said gasket means is a rubber gasket ring.

11. A cover or lid according to claim 10 wherein said gasket ring is engaged between said outer rim and said top flat surface.

12. The cover or lid according to claim 1 wherein said slot is about three and a half inches in height and about one and a half inches wide.

13. The cover or lid according to claim 1 wherein said gripping bar is about one half inch in thickness.

14. The cover or lid according to claim 1 wherein the transparent plastic material is an ultraviolet stabilized polycarbonate plastic.

15. The cover or lid according to claim 1 wherein the transparent plastic material is ultraviolet stabilized polyetherimide plastic.

16. The cover or lid according to claim 1 wherein the handle bar assembly is about six and a half inches in length.

17. The cover or lid according to claim 16 wherein the handle bar assembly is about four and a half inches in height.

* * * * *